(12) United States Patent
Helm et al.

(10) Patent No.: US 6,441,725 B1
(45) Date of Patent: Aug. 27, 2002

(54) ELECTRONIC VISUAL INDICATION SYSTEM

(75) Inventors: Gordon L. Helm, St. Joseph, MI (US);
Adeyemi O. Adesuyi, 3853 Brummel, Skokie, IL (US) 60076; Shihab F. M. Taha, 9712 S. Nottingham Ave., Chicago Ridge, IL (US) 60415

(73) Assignees: Shihab F. M. Taha, Chicago Ridge; Adeyemi O. Adesuyi, Skokie, both of IL (US)

( * ) Notice: Subject to any disclaimer, the term of this patent is extended or adjusted under 35 U.S.C. 154(b) by 0 days.

(21) Appl. No.: 09/977,724

(22) Filed: Oct. 15, 2001

(51) Int. Cl.[7] .................................................. H04B 3/36
(52) U.S. Cl. ................... 340/425.5; 340/576; 340/5.81; 705/4; 705/13
(58) Field of Search .............................. 340/425.5, 426, 340/576, 5.81; 705/13, 4

(56) References Cited

U.S. PATENT DOCUMENTS 6,076,064 A * 6/2000 Rose, Jr. ........................ 705/1
6,167,333 A * 12/2000 Gehlot ........................ 340/436

* cited by examiner

*Primary Examiner*—Daniel J. Wu
(74) *Attorney, Agent, or Firm*—Katten Muchin Zavis Rosenman

(57) ABSTRACT

An electronic visual indication system for a motor vehicle which indicates whether the motor vehicle has current motor vehicle insurance coverage. The electronic visual indication system is configured so that it is detectable from the outside of the automobile to enable law enforcement officials to enforce the state statutes requiring motor vehicle operators to have current motor vehicle insurance without stopping the vehicle and manually checking the motor vehicle operator's proof of insurance. In one embodiment of the invention, the electronic vehicle indication system is enabled by, for example, a smart card, magnetic card or the like (collectively referred to as a validation card), which enables the electronic vehicle indication system for a predetermined period of time. The validation card is adapted to be validated by an insurance agent for a validation period of the insurance coverage for the motor vehicle. The validation card, in turn, is used to enable the electronic vehicle indication system to provide a visual indication of vehicle insurance coverage while a vehicle is in motion to facilitate enforcement of various state laws requiring such insurance coverage by law enforcement personnel.

11 Claims, 2 Drawing Sheets

ELECTRONIC VISUAL INDICATION SYSTEM

BACKGROUND OF THE INVENTION

1. Field of the Invention

The present invention relates to an electronic visual indication system for a vehicle and more particularly to an electronic visual indication system for a vehicle that is viewable from outside the vehicle for verifying whether the operator of the vehicle has current vehicle insurance.

2. Background of the Invention

Many states have enacted legislation which requires drivers of vehicles to have vehicle insurance and in particular liability insurance to cover the expenses of a third party involved in an accident with the insured vehicle. Violations of these statutes are normally determined after the vehicle has been involved in an accident. Unfortunately, based on the status of the current legislation of the various states, there are no known means to insure that vehicle operators have current vehicle insurance. Although some states require proof of insurance before a vehicle operator can obtains a license for the vehicle, vehicle licenses are only renewed on an annual basis. The vehicle insurance for that vehicle can expire any time within that one-year. Accordingly, the potential exists for vehicle operators to operate their vehicles without vehicle insurance as required by several of the state statutes.

With the present system, as mentioned above, these violators are normally not caught until it is too late; until after they have been involved in an accident with the third party or during initial citation processing after the vehicle has been stopped. Unfortunately, such uninsured motor vehicle operators cause increased insurance costs as well as impose financial burdens to the other parties involved in the accident. In particular, insured motor vehicle operators with uninsured motor vehicle insurance coverage, when involved in an accident with uninsured motor vehicle operators, will normally file a property claim with their own insurance company, leaving it up to their insurance company to try and collect from the uninsured motor vehicle operator. For those insured drivers who do not have uninsured motor vehicle coverage, these insured drivers must absorb the cost of property damage resulting from the accident themselves; thus placing a burden on society in general. In addition, medical expenses resulting from the accident are often passed onto the injured party's health insurance provider. Thus, there is a need for a system for determining whether a motor vehicle operator has valid motor vehicle insurance prior to being involved in an accident.

SUMMARY OF THE INVENTION

Briefly, the present invention relates to an electronic visual indication system for a motor vehicle which indicates whether the motor vehicle has current motor vehicle insurance coverage. The electronic visual indication system is configured so that it is viewable from the outside of the automobile to enable law enforcement officials to enforce the state statutes requiring motor vehicle operators to have current motor vehicle insurance without stopping the vehicle and manually checking the motor vehicle operator's proof of insurance. In one embodiment of the invention, the electronic vehicle indication system is enabled by, for example, a smart card, magnetic card, machine readable code, such as a bar code or a substrate or the like (collectively referred to as a validation card), which enables the electronic vehicle indication system for a predetermined period of time. The validation card is adapted to be validated by an insurance agent for the validation period of the insurance coverage for the motor vehicle. The validation card, in turn, is used to enable the electronic vehicle indication system to provide a visual indication of vehicle insurance coverage while a vehicle is in motion to facilitate enforcement of various state laws requiring such insurance coverage by law enforcement personnel.

DESCRIPTION OF THE DRAWINGS

These and other advantages of the present invention will be readily understood with reference to the following specification and attached drawings wherein.

DETAILED DESCRIPTION

The present invention relates to an electronic vehicle indication system that allows the status of a motor vehicle operator's vehicle insurance to be checked visually by law enforcement officials without stopping the vehicle. The electronic vehicle visual indication system is adapted to be enabled by machine readable code, such as a bar code on a substrate, smart card, magnetic card or various types of electronic or optical media, hereinafter "validation card". The validation card is adapted to be validated by an insurance agent, which indicates the period of valid motor vehicle insurance coverage and correlates it with a vehicle identification number (VIN). The validation card is then swiped or otherwise used to enable a reader, which may be a machine readable code reader, such as a bar code reader, smart card reader, magnetic card reader, optical reader or the like.

Such smart card readers are commonly known in the art. An example of a smart card reader is disclosed in U.S. Pat. Nos. 5,624,316 and 6,101,477. Magnetic card readers are also commonly known in the art. Examples of such magnetic card readers are disclosed in U.S. Pat. Nos. 6,089,881; 6,082,617 and 6,076,739. U.S. Pat. No. 4,650,978 describes a magnetic programmer for programming magnetic stripes on media. Examples of optical readers are disclosed in U.S. Pat. Nos. 4,721,849, 4,801,789 and 6,290,133. U.S. Pat. No. 5,949,042 discloses a system for reading machine readable code, such as a bar code while U.S. Pat. Nos. 5,564,841; 5,768,991; 5,781,708; 5,857,789; 5,984,193; 6,199,765 and 6,283,647 disclose a system for printing machine readable code.

The electronic vehicle indicator system can optionally be provided with an external port, for example, a serial port, which can be, used by law enforcement officials during traffic stops. As will be discussed in more detail below, the external port allows the law enforcement official to plug into the port to read the history data from the vehicle electronic indication system.

Figure 1:
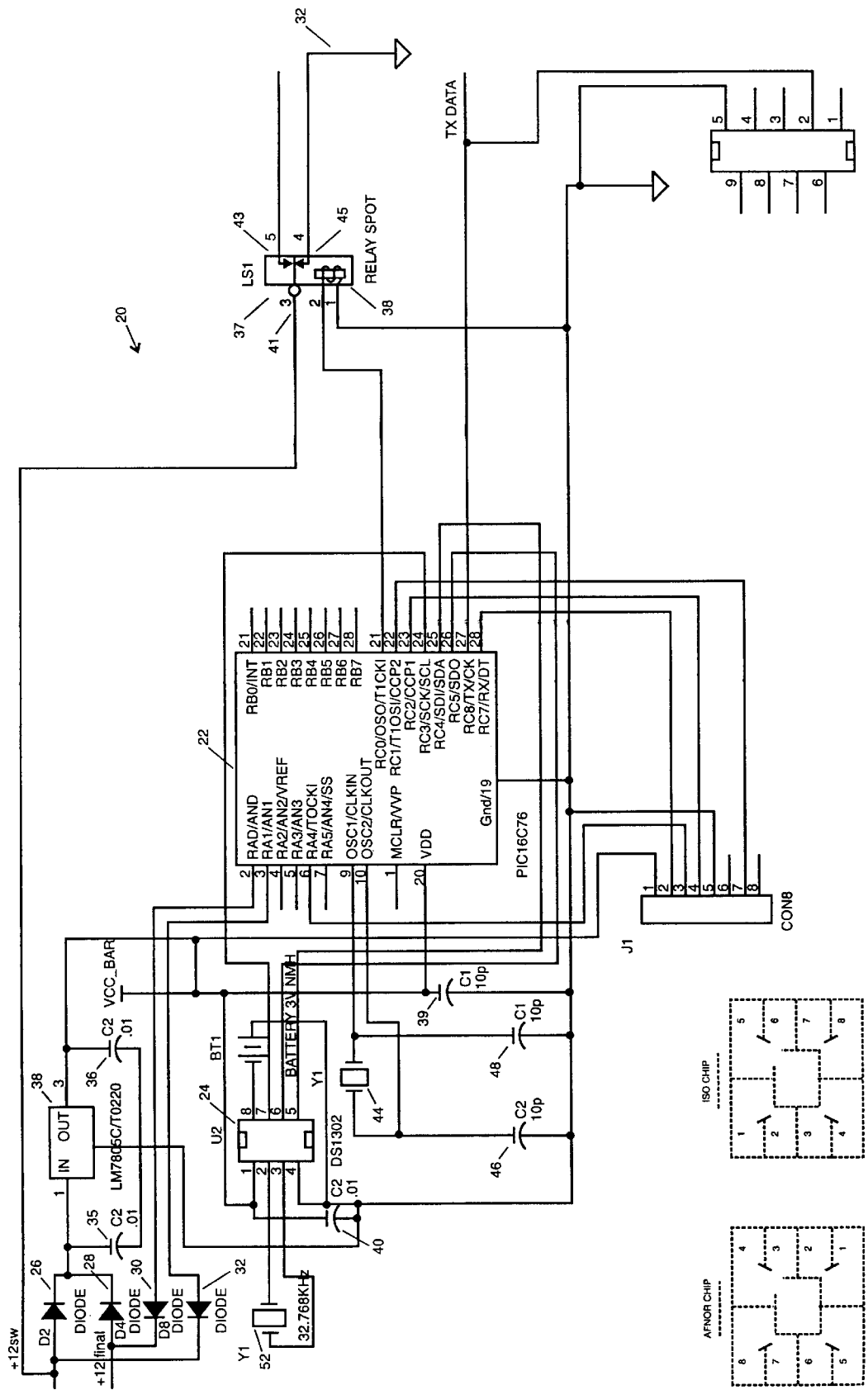
FIG. 1 is a schematic diagram of the electronic visual indication system in accordance with the present invention.

Turning to FIG. 1, an exemplary circuit for implementing the vehicle electronic visual indication system is shown and generally identified with the reference numeral 20. The vehicle electronic vehicle indication system 20 includes an 8 bit microcontroller 22, for example, a Microchip, Model No. PIC 16C76. The circuit 20 also includes a real time clock with nonvolatile memory, generally identified with the reference numeral 24. The real time clock 24 is used by the microprocessor 22 to compare current date and time with data provided by the validity card. The non-volatile memory provided with the real time clock 27 may also be used for storing the vehicle identification number (VIN), history data, the expiration date and current date and time. This data may alternatively or concurrently be stored in a separate non-volatile memory, such as a flash memory, or an electronically erasable programmable read only memory (EEPROM), provided as part of the microprocessor 22.

The power for the circuit 20 may be provided by the vehicle 12 Vdc electrical system. In particular, the circuit may be coupled to a fixed 12 Vdc supply, identified as +12 fixed, and a switched 12 Vdc supply, +12 SW, that is only active when the vehicle ignition switch (not shown) is in the ON position. The 12 Vdc switched DC power supply is coupled to an anode of a diode 26. The 12 Vdc switched DC supply is also coupled to a relay 30, which, in turn, controls an indicating device, illustrated as an exemplary lamp 32. The 12 Vdc fixed DC supply is coupled to an anode of a diode 28. The 12 Vdc fixed supply is active all the time and is not dependent upon the position of the vehicle ignition switch.

The cathodes of both diodes 26 and 28 are coupled together and to a 3 Vdc voltage regulator 38, for example a (manufacture name), model number LM 7805C/TO220. A pair of capacitors 35 and 36 are coupled between the input and the output of a voltage regulator 38 to stabilize the input and output voltages of the regulator 38.

The voltage regulator 38 provides a regulated 3 Vdc supply to the microcontroller 22 and to the real time clock 24. More specifically, the regulated output of the voltage regulator 38 is supplied to a VDD pin on the microcontroller 22. A bypass capacitor 39 is also coupled between the VDD pin and system ground. The regulated output from the regulator 38 is also coupled to Pin 1 of the real time clock 24. A bypass capacitor 40 is connected between pin 1 of the real time clock 24 and system ground.

A crystal 40, for example, a 20 MHz crystal, along with a pair of capacitors 46 and 48 are used to form an oscillator input for the microcontroller 22. These devices are connected to the OSC1 and OSC2 pins of the microprocessor 22. Another crystal 52 is used to drive the real time clock 24, for example, a 32.768 KHz crystal.

The circuit 20 also includes a connector J1 that may be used to connect to a reader as discussed above. This data is stored in the non-volatile memory included as part of the real time clock 24.

An output port, identified as J2, may optionally be provided. A law enforcement officer during a traffic stop may use the output port for downloading historical data on the system, for example. As shown, the output port J2 is shown as a serial port. However, various other output port interfaces are possible depending on the read out equipment of the law enforcement officer.

As will be discussed in more detail below, the circuit 20 provides a visual indication of the status of the vehicle operators insurance. The visual indication may be provided by the indicating light 32 or other equivalent form of visual indication. The indicating light 32 is under the control of a relay 37 which includes a relay coil 38 and a single pole double throw switch which includes a common pole 41, a normally closed contact 43 and a normally open contact 45. The common pole 41 is connected to the 12 Vdc switched supply, +12 sw, which, as mentioned above, is only active when the vehicle ignition switch is in the ON position. Thus, when the vehicle ignition switch is in positions other than the ON position, power to the indicating lamp 32 will be disconnected, thus conserving battery power.

The relay coil 38 is connected to an output port, pin 11 on the microprocessor 22. When a validation card is interfaced with the circuit 20 and indicates valid vehicle operator insurance, the pin 11 will go high generating a validation signal causing the relay coil 38 to be energized. When the relay coil 38 is energized, the single-pole double-throw contact switches from the normally closed contact 43 to the normally opened contact 45. In this condition, a continuous electrical path is made from the 12 Vdc switched DC supply, +12 sw, through the common pole 41, through the normally open contact 45, the indicating lamp 32 and system ground to illuminate the indicting lamp 32.

Once the circuit 20 determines that the validity period of the vehicle operator insurance has terminated, pin 11 of the microprocessor 22 will go low thereby de-energizing the relay coil 38 causing the contact 45 to open, which removes power from the indicting light 32. The indicating light 32 will remain in a non-illuminated condition until such time the system receives a validation card indicating current vehicle insurance.

Figure 2:
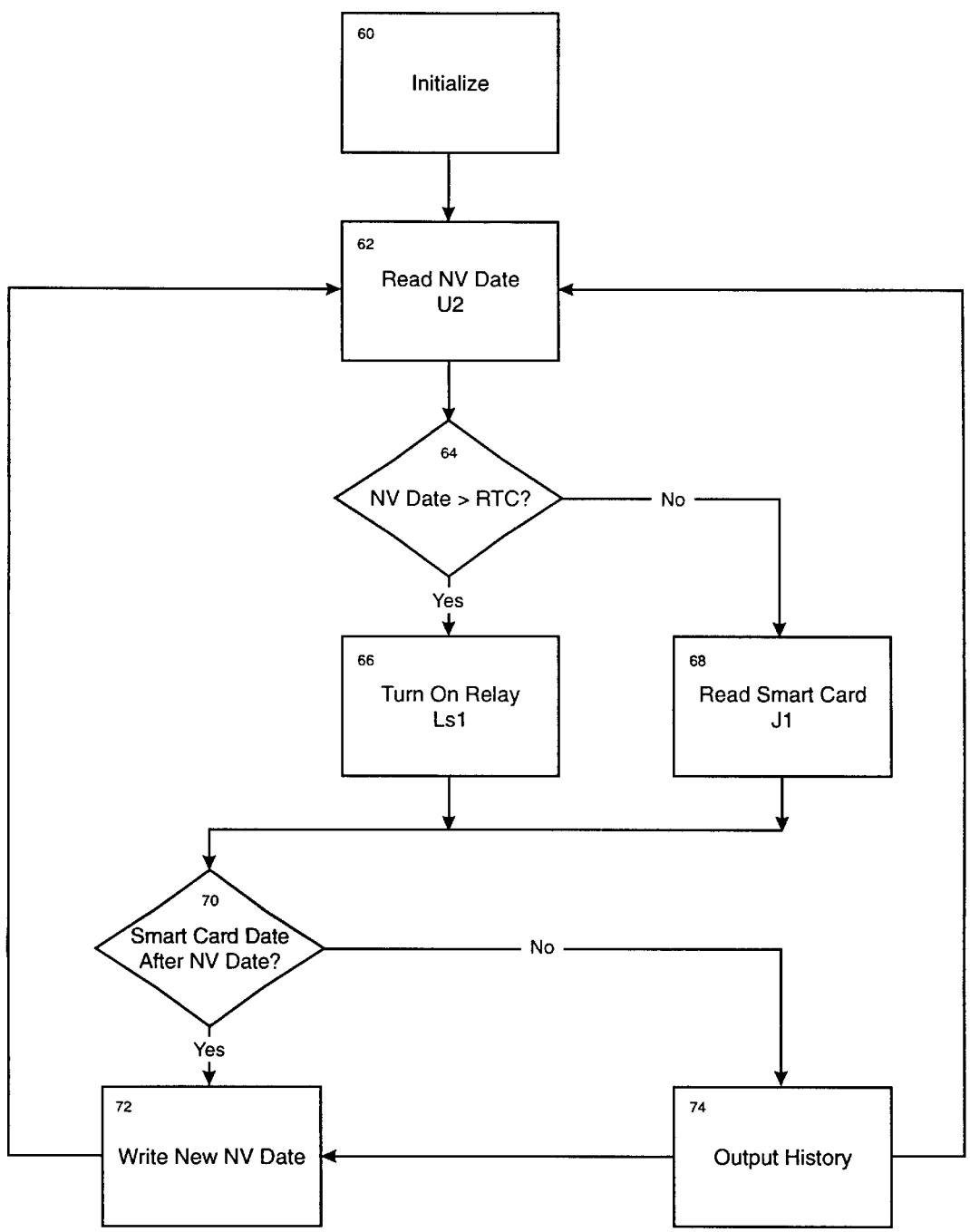
FIG. 2 is a flow chart for the electronic visual indication system illustrated in FIG. 1.

Referring to FIG. 2, a flow chart is illustrated for operating the vehicle electronic indication system. Upon power up, the system is initialized in step 60. After initialization, the system reads the expiration date stored in the non-volatile memory portion of the real-time clock 24 in step 62. The expiration date and the date of the real time clock are compared in step 64. If the expiration date is after the date provided by the real time clock 24, the microprocessor 22 forces pin 11 to go high in step 66 thus energizing the relay 39 and illuminating the indicating lamp 32. Once the validation period expires, the microprocessor 22 causes pain 11 to go low, thus de-energizing the relay 37 and the indicating lamp 32.

If the current expiration date in the non-volatile memory is not greater than the date generated by the real time clock 24, the system waits to read the validation card, which as, mentioned above, may be either a smart card, magnetic card, machine readable code, such as a bar code on a substrate, or the like by way of the connector J1. As shown, pin 1 of the connector J1 may be tied to the output of the voltage regulator 38 for providing a 3-volt power supply to the reader as discussed above connected to the connector J1. Pin 5 of the connector J1 is connected to system ground for completing the circuit path for the device connected to the connector J1. Pins 3, 4 and 7 are connected to various input pins on the microprocessor 22 for reading the data stored in the smart card or magnetic card.

After the validation card is read in step 68, the system compares the expiration date read from the validation card with the expiration date currently stored in the non-volatile memory portion of the real time clock 24 in step 70. If the new expiration date is greater than the date currently stored, the new date is written to the non-volatile memory portion of the real time clock 24 in step 72. If not, the latest expiration date as currently stored in the non-volatile memory portion of the real time clock 24 is made available on pin 17 in step 74 as shown in FIG. 1. As discussed above, pin 17 of the microprocessor is connected to a connector J2 to enable law enforcement officials to determine the last expiration date for insurance. The system returns to from steps 72 and 74.

Obviously, many modifications and variations of the present invention are possible in the above teachings. Thus, it is to be understood that, within the scope of the appended the invention may be practiced otherwise than as specifically described above.

We claim:

1. An electronic visual indication system for indicating whether the operator of a motor vehicle has current insurance for the vehicle comprising:
- a validation card reader for reading a validation card which includes insurance expiration data and vehicle identification number (VIN) for a vehicle;
- a real time clock for providing the current time and date;
- a memory for storing a VIN defining a stored VIN number;
- a system responsive to data from said validation card reader for comparing said insurance expiration data with the current time and date and comparing the VIN number from said validation card reader with said stored VIN number and generating a validation signal when said VIN numbers match and when said expiration date is after said current time and date; and
- a visual indicating device coupled to said circuit so as to illuminate in response to said validation signal.

2. The electronic visual indication system as recited in claim 1, wherein said reader is reader for reading machine readable code.

3. The electronic visual indication system as recited in claim 2, wherein said machine readable code is a bar code.

4. The electronic visual indication system as recited in claim 1, wherein said reader is an optical reader.

5. The electronic visual indication system as recited in claim 1, wherein said reader is magnetic reader.

6. The electronic visual indication system as recited in claim 1, wherein said reader is a smart card reader.

7. The electronic visual indication system as recited in claim 1, wherein said system includes a memory for storing the last expiration date.

8. The electronic visual indication system as recited in claim 1, further including an external port for enabling the last expiration date to be read therefrom.

9. The electronic visual indication system as recited in claim 1, wherein said system includes a microprocessor.

10. The visual indication system as recited in claim 1, wherein said electronic visual indication system is electrically coupled to vehicle ignition switch having an ON position.

11. The electronic visual indication system as recited in claim 10, wherein said indicating device is only enabled wherein said vehicle ignition switch is in said ON position.

* * * * *

UNITED STATES PATENT AND TRADEMARK OFFICE
CERTIFICATE OF CORRECTION

PATENT NO. : 6,441,725 B1  Page 1 of 1
DATED : August 27, 2002
INVENTOR(S) : Gordon L. Helm It is certified that error appears in the above-identified patent and that said Letters Patent is hereby corrected as shown below:

<u>Title page,</u>
Item [12], "Helm et al." should read -- Taha et al. --;
Item [75], Inventors should read as follows:
-- [75]  Inventors:  Shihab F.M. Taha, 9712 S. Nottingham Ave., Chicago Ridge, IL (US) 60415; Adeyemi O. Adesuyi, 3853 Brummel, Skokie, IL (US) 60076; Gordon L. Helm, St. Joseph, MI (US); --

Signed and Sealed this

Eighteenth Day of March, 2003

JAMES E. ROGAN
*Director of the United States Patent and Trademark Office*